United States Patent Office 3,708,595
Patented Jan. 2, 1973

3,708,595
α-NITRO-ω-OXIMINO CYCLOALKANONES
AS FUNGICIDES
Robert Fuhrmann, Morris Plains, John Pisanchyn, Morristown, and Stylianos Sifniades, Parsippany, N.J., assignors to Allied Chemical Corporation, New York, N.Y.
No Drawing. Filed Oct. 30, 1970, Ser. No. 85,759
Int. Cl. A01n 9/20
U.S. Cl. 424—327
6 Claims

ABSTRACT OF THE DISCLOSURE

α-Nitro-ω-oximino cycloalkanones are effective fungicides and fungistats. In particular, they are effective against rust type fungi. The preferred compound is 2-nitro-6-oximino cyclohexanone.

CROSS REFERENCES TO RELATED APPLICATIONS

The α-nitro-ω-oximino cycloalkanones of the instant invention and the preparation thereof are described in copending commonly assigned applications for U.S. Letters Patent Ser. No. 852,881, now abandoned and Ser. No. 852,947, filed Aug. 25, 1969.

BACKGROUND OF THE INVENTION

This invention relates to a class of compounds which has proven effective against many of the fungus-type diseases which attack and destroy or damage many important food crops and ornamental plants. Plants are, of course, subject to attack and damage by a wide variety of pathogens. Among the most difficult to combat and the most harmful are the fungus-type diseases, particularly the so-called plant rusts. Among the best known plant fungus-type diseases are wheat leaf rust, bean rust, safflower rust, coffee rust, cocoa black spot, maple leaf spot, apple blotch, anthracnose, peach leaf curl, powdery mildew, brown rot, apple scab, Dutch elm disease, chestnut blight, ergot, corn smut, tree heart rot, cabbage leaf spot, pear bitter rot, currant and gooseberry leaf spot, flax blight, citrus wither tip, apple canker, citrus scab, rose leaf spot, rose black spot, grape bitter rot, tea grey blight, coconut leaf spot, cherry shot-hole, apple pink rot, downy mildew of grape, tobacco and lettuce, potato seedling rot, rice blast, tomato late blight, wheat stem rust, potato late blight and Gummosis.

In view of the severe crop losses which occur every year due to these fungus-type diseases, obviously, any chemical which would effectively destroy or at least inhibit the spread of such fungus-type diseases would be extremely useful. Unfortunately, all of the currently available fungicides and fungistats suffer from one or more shortcomings, e.g. limited effectiveness against other than a single type fungus, high cost, or specialized conditions of application.

SUMMARY OF THE INVENTION

It has now been found in accordance with the instant invention that compounds of the structure

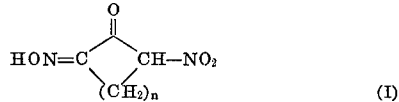

wherein $n=2$ to 9, are effective as fungicides or fungistats against a wide variety of fungus-type plant diseases.

Compounds of Formula I which are α-nitro-ω-oximino cycloalkanones are prepared by nitrosation of the corresponding α-nitrocycloalkanones.

This nitrosation reaction can be schematically represented as follows:

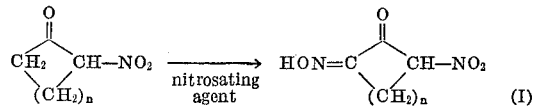

wherein $n=2$ to 9.

Suitable nitrosating agents include the $C_1$ to $C_4$ alkyl nitrites, nitrosyl formate, chloride, or bromide and $N_2O_3$. The preferred nitrosating agent is methyl nitrite or nitrosyl chloride.

As heretofore indicated, $C_5$ to $C_{12}$ α-nitrocycloalkanones are the compounds nitrosated in accordance with the instant invention. These compounds are ordinarily prepared by nitrating the corresponding ketone. Such nitration is most advantageously carried out by forming the enol acylate of the ketone by reaction of the ketone with a carboxylic acid anhydride or with ketene, e.g. using cyclohexanone,

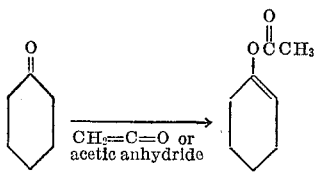

The enol acetate is then nitrated with a nitrating agent such as acetyl nitrate. The preparation of 2-nitrocyclohexanone, also known as α-nitrocyclohexanone, is described for example in J. Org. Chem., 31, 357 (1966).

Suitable ketones include any of the $C_5$ to $C_{12}$ cycloalkanones such as cyclo-pentanone, -hexanone, -heptanone, -octanone, -nonanone, -decanone, and -dodecanone.

The nitrosation of the 2-nitrocycloalkanone to form the 2-nitro-ω-oximinocycloalkanone is most suitably carried out in an inert solvent so as to provide good contact between the nitrocycloalkanone and the nitrosating agent and to facilitate temperature control. Although the nitrosation can be carried out at virtually any temperature between the freezing and boiling points of the selected solvent, we have found that the preferred reaction temperature is between —30° C. and 25° C. Below —30° C., the reaction rate is low. Above about 25° C., side reactions tend to occur which tend to reduce the yield of 2-nitro-ω-oximinocycloalkanone and cause the formation of difficult to remove contaminants. The preferred reaction temperature range is about —20° C. to +5° C. The optimum reaction conditions can vary slightly depending on the particular nitrocycloalkanone undergoing reaction.

A suitable nitrosation reaction solvent should not only be liquid in the preferred reaction temperature range, but it should also be inert to the nitrosating agent being used. This limits the readily available usable solvents to halogenated $C_1$–$C_4$ alkanes, alkane mono- and diethers of 4–8 carbons and liquid sulfur dioxide. The term "halogenated alkane" connotes n- or isoalkanes that have at least one-third of the hydrogens thereof replaced by fluorine, chlorine, or bromine, preferably fluorine or chlorine. Suitable examples of such halogenated alkanes include $CCl_4$, tetrachloroethane, dichloroethane, $CH_2Cl_2$, $CHCl_3$, tetrachloroethylene, bromoform, perfluorobutane, and the various fluorochlorohydrocarbons sold commercially under the trademark "Genetron" or "Freon." Suitable alkane ethers include diethyl ether, glyme, diglyme, diethyl Carbitol, and the like. The preferred solvent is liquid sulfur dioxide or glyme. Although other inert organic solvents are available and usable, they are not preferred for reasons of economic practicality. The solvent is preferably substantially or completely water free.

As heretofore indicated, suitable nitrosating agents include the $C_1$–$C_4$ alkyl nitrites, nitrosyl formate, nitrosyl chloride, nitrosyl bromide, and $N_2O_3$. The preferred nitrosating agent is methyl nitrite or nitrosyl chloride. The nitrosation is ordinarily carried out by dissolving the 2-nitrocycloalkanone in solvent, cooling the solution to about −15° C., and then adding 1.0–1.5 mols of the nitrosating agent per mol of nitrocyclohexanone and sufficient HCl to make the reaction mixture 5 to 20 moles in HCl. The nitrosation reaction is ordinarily complete within from 1–12 hours after at least a molar equivalent of nitrosating agent per mole of nitrocycloalkanone has been added.

Completion of the nitrosation reaction is most conveniently ascertained by the vapor phase chromatographic analysis of an aliquot of the reaction mixture. Although the reaction is not strongly endothermic or exothermic, it is desirable to maintain the reaction mixture within the desired temperature range throughout the course of the nitrosation reaction. The reaction is not pressure sensitive and can be carried out at either ambient or superatmospheric pressure. The concentration of the $\alpha$-nitrocycloalkanone in the solvent, although not critical, is most suitably from about 3 to about 50 percent by weight, preferably 5 to 15% by weight.

We have found that the nitrosation reaction proceeds much more readily in the presence of a strong acid catalyst. Any nonoxidizing acid having a pKa of less than 1 is suitable, such as hydrochloric or hydrobromic. The amount of acid present in the reaction mixture is not critical, but it should preferably be sufficient to make the solution 0.5–20 molar in acid. Because of its high volatility, hydrochloric acid is readily removed from the reaction mixture after completion of the nitrosation reaction and for this reason, it is preferred. In the case of HCl, the preferred concentration is 5 to 20 molar.

The acid can be added prior to or simultaneously with the nitrosating agent. Work-up of the nitrosation mixture after completion of the reaction is most advantageously carried out by stripping off the reaction solvent, any excess nitrosating agent, and the HCl catalyst under reduced pressure, preferably at a temperature below about 0° C. If a nonvolatile acid catalyst is used, it must be removed from the reaction mixture or neutralized prior to removal of the solvent by stripping.

Sulfur dioxide possesses a number of advantages over other reaction solvents. It is nonflammable, inexpensive, and it is a very good solvent for both reactants and products. Additionally, because of its low boiling point, $SO_2$ can be readily removed at low temperature without the need for provision for vacuum stripping. As heretofore indicated, HCl is the preferred acid catalyst. HCl has a comparatively low solubility in $SO_2$ at atmospheric pressure and a high solubility at pressures above about 5 atmospheres. Therefore, removal of both $SO_2$ and HCl from the product after completion of the reaction is readily accomplished by allowing the reaction mixture to come to atmospheric pressure at a temperature below about −10° C. causing the HCl to flash off and then allowing the temperature to rise about −10° C. causing flash-off of the $SO_2$ leaving behind the desired product as a residue. This residue can be further utilized or formulated without additional purification or, if desired, it can be recrystallized from a solvent such as a $C_1$ to $C_4$ alkanol.

As used in the instant specification and in the appended claims, the term "fungicide" or "fungicidal" encompasses controlling fungi both by killing same and also by inhibiting the growth thereof without actually killing said fungi. Inhibiting the growth of fungi without killing same is sometimes more particularly described as acting as a fungistat.

The preferred fungicide, especially because of the ready availability of the cyclohexanone starting material, is 2-nitro-6-oximino cyclohexanone.

Normally, the compounds of the instant invention will be used as the active ingredient in a fungicidal composition, including a carrier, although they can also be used without a carrier. Various carriers or other diluents can be employed and the percent of compound, i.e. active ingredient present in a fungicidal formulation can be varied over a wide range. Although compositions with as low as 100 p.p.m. or even less by weight of active ingredient can be used, it is preferable to use compositions containing at least about .05% of active ingredient because otherwise the amount of carrier becomes excessively large. In general, activity increases with the concentration of active ingredient, which can, of course, range up to 50% or even higher.

The amount of composition which is applied for effective fungicidal action is dependent upon consideration such as the concentration of active ingredient, type of fungus to be killed, the density and type of plants, i.e. vegetation, being treated, and soil and climatic conditions. Preferably, sufficient composition will be applied to provide about 0.1 to 10 pounds of active ingredient per acre of vegetation.

The fungicidal compositions of the instant invention can be in the form of a solution, with the solvent being acetone. methanol, aqueous alkali, and the like. These solutions can be applied to the plants in a direct manner such as by spraying, sprinkling, drenching the plants, etc. Aqueous dispersions of the fungicides of the instant invention can also be applied in this manner.

Application can also be achieved by dusting a powder in which the active ingredient is dispersed. Suitable carriers include finely powdered material such as clay, fuller's earth, and talc. Such powders are preferred in some applications for their ease of handling, and in situations where the weight and unavailability of water are important factors.

The nitrooximino ketone compounds of the instant invention can constitute the sole active ingredient in a fungicidal composition, but they can also be effectively used in combination with other biologically active ingredients such as other fungicides or herbicides, phytocides, insecticides, or other plant treating agents.

The invention can be more fully understood by reference to the following examples. All parts are parts by weight unless otherwise expressly noted.

EXAMPLE 1

A solution of 31.2 grams (0.218 mol) 2-nitrocyclohexanone in 600 ml. anhydrous diethyl ether was saturated with anhydrous HCl at 0° C. To this solution, 23 g. (0.223 mol) n-butylnitrite was added dropwise during 10 minutes under a nitrogen atmosphere while keeping the temperature at 0° to 5° C. After standing for an additional 10 minutes at 0°–5° C., the reaction mixture was stripped under reduced pressure in a rotary evaporator. The light yellow crystals of 2-nitro-6-oximinocyclohexanone (NOC) which formed in the concentrated solution were recovered by filtration and then washed with ether: weight after drying 13.0 g. (35% yield).

EXAMPLE 2

Nitrosation of nitrocyclohexanone with methyl nitrate in diethyl ether

Ten grams (0.070 mol) of 2-nitrocyclohexanone was dissolved in about 300 ml. of diethyl ether which had been saturated at 0° C. and atmospheric pressure with dry HCl gas. The solution was then treated with 6.0 ml. (6.0 grams, 0.098 mol) of methyl nitrite, added in one portion at −20° C. The solution was allowed to warm to −10° C. and was kept at that temperature for 1.5 hours. The solution was then evaporated to dryness on the rotary evaporator keeping the temperature below 10° C. The residual yellow oil was scratched to induce crystallization, and the resulting yellow crystals of NOC were triturated with cold ether (100 ml.) and collected by filtration.

Yield: 3.8 grams (32%); melting point 160° C. (with dec.).

EXAMPLE 3

Nitrosation of nitrocyclohexanone with methyl nitrite in glyme

A 10.0 gram (0.070 mol) sample of 2-nitrocyclohexanone was dissolved in 350 ml. of 10 N HCl in dry 1,2-dimethoxyethane (glyme) and the resulting solution then treated with 6.0 ml. (6.0 gram, 0.098 mol) of methyl nitrite at −20° C. After 3.5 hours at −13° C., a 50 ml. aliquot was removed for work-up and analysis. Nearly quantitative conversion of the nitrocyclohexanone to the desired 1-nitro-6-oximinocyclohexanone was indicated by gas chromatographic analysis of the aliquot.

The remaining solution was worked up after an additional standing of ½ hour as follows: The volatile components were stripped on a rotary evaporator at −10° C. and the residue triturated with cold methanol. The resulting yellow crystals of NOC were collected by filtration and washed with a few milliliters of cold methanol. The 50 ml. aliquot was worked up in a similar fashion. Yield from both portions: 7.74 grams (64.5%).

EXAMPLE 4

Nitrosation of α-nitrocyclohexanone with nitrosyl chloride in glyme

A 10.0 gram (0.070 mol) sample of α-nitrocyclohexanone was dissolved in 350 ml. of 10 N HCl in glyme, and the solution then treated with 3.1 ml. (about 4.5 g., 0.07 mol) of nitrosyl chloride at −20° C. The temperature of the mixture was kept at −20° C. for 2.5 hours and then at −15° C. for 3 hours. At this point, the conversion of nitrocyclohexanone was 80% and the reaction mixture was evaporated to dryness on the rotary evaporator at about −10° C. The evaporation residue was triturated with about 20 ml. cold methanol, filtered, and washed with a few additional milliliters of cold methanol. The resulting light-yellow crystalline powder weighed 5.21 grams. The mother liquor contained an additional 0.93 grams for a total yield of 6.14 grams; yield 64% based on reacted nitrocyclohexanone.

EXAMPLE 5

Approximately 60 cc. of liquid $SO_2$ was saturated with anhydrous HCl at −15° C. and atmospheric pressure. This yielded a solution 0.8 molar in HCl. Three grams of nitrocyclohexanone (0.021 mol) and 1.8 grams (0.03 mol) of methyl nitrite were then added, and the clear red solution which formed was kept at −15° C. for 3 hours. The $SO_2$ and HCl were then stripped off while maintaining the reaction mixture below 0° C., and the residue was recrystallized from a small amount of methanol at approximately −10° C. The percentage conversion of nitrocyclohexanone to 2-nitro-6-oximino-cyclohexanone was 60 mol percent as determined by vapor phase chromatographic analysis of the reaction mixture for unreacted starting material. The amount of 2-nitro-6- oximino cyclohexanone recovered from the crystallization was 0.64 gram while 0.32 gram was present in the mother liquor. This amounts to a total of 0.96 gram of oximinonitrocyclohexanone or 44 mol percent based on consumed nitrocyclohexanone starting material.

EXAMPLE 6

A solution of 1.5 grams (10.5 millimols) of nitrocyclohexanone was dissolved in 33 cc. of liquid $SO_2$ and this solution was then saturated with gaseous HCl at −15° C. and approximately 4 atmospheres producing a solution approximately 5 M in HCl. At this point, the solution was cooled to −80° C. and 1.5 grams (25 millimols) of methyl nitrite added. The reaction mixture was brought to reaction temperature of −15°±2° C. and this temperature maintained for 4 hours. The $SO_2$ and HCl present were removed while maintaining the temperature below 0° C., and the residue was recrystallized from a small amount of methanol. 0.713 gram of pure crystalline 2-nitro-6-oximino-cyclohexanone was obtained while 0.482 gram of the same product remained in the filtrate. The amount of desired product amounted to 1.20 gram or 68% based on 2-nitrocyclohexanone consumed. Vapor phase chromatographic analysis showed that at least 99 mol percent of the starting material nitrocyclohexanone had been consumed.

EXAMPLE 7

To a solution of 1.5 grams (10.5 millimols) of nitrocyclohexanone in 33 cc. liquid $SO_2$, which had been saturated with HCl to give a 4.4 molar solution, was added 1.1 grams (17.0 millimols) of nitrosyl chloride while the temperature was maintained at −78° C. The mixture was then allowed to warm up to about −15° C. and maintained at this temperature for 3.5 hours. The pressure was 37 p.s.i.g. The volatiles (unreacted NOCl, $SO_2$, and HCl) were removed by flash distillation at a temperature below 0° C. The residue was recrystallized from a small amount of methanol at −10° C.

The conversion of nitrocyclohexanone was 43.5%. 76.5 milligrams of crystalline 2-nitro-6-oximinocyclohexanone was obtained from the methanol recrystallization while an additional 150 mg. was present in the mother liquor. The total amount of 2-nitro-6-oximinocyclohexanone was 227 mg. or 29 mol percent of theory based on consumed 2-nitrocyclohexanone.

EXAMPLE 8

Nitrosation of α-nitrocyclododecanone with nitrosyl chloride in glyme

A 11.4 gram sample of α-nitrocyclododecanone was dissolved in 60 ml. of 10.5 M HCl in glyme, and the solution was treated with 2.7 ml. of nitrosyl chloride at 0° C. The temperature of the mixture was kept at 0° C. for 3½ hours. At this point, the reaction mixture was evaporated in flash evaporator affording an oily residue. The residue was dissolved in 20 ml. chloroform and refined by passing through a column of 100 g. silica gel. Chloroform was used as eluent. Evaporation of the solvent left 6.1 g. of crystalline 2-nitro-12-oximino cyclododecanone. The melting point after recrystallization from chloroform-ether was 117° C. to 119° C.

EXAMPLE 9

Fungicidal activity

Solutions of the compound 2-nitro-6-oximino cyclohexanone in acetone were tested against various well-known plant fungi by treating plants infected with said fungi with varying amounts of the compound and determining the percent of fungi which were controlled, i.e. either killed or whose growth was inhibited. Spraying with 100 p.p.m. compound concentration spray is equivalent to about ¼ lb. per acre of active ingredient.

| | Percent control at indicated conc. of compound | | |
|---|---|---|---|
| | 100 p.p.m. | 250 p.p.m. | 500 p.p.m. |
| Type of fungi: | | | |
| BNR | 77 | 100 | 100 |
| SFR | 99 | 100 | 100 |
| LWR | 78 | 100 | 100 |

NOTE.—BNR=Bean rust; SFR=Safflower rust; LWR=Wheat leaf rust.

EXAMPLE 10

Solutions of the compound 2-nitro-12-oximino cyclododecanone in acetone were tested against various well-known plant fungi by treating plants infected with said fungi with varying amounts of the compound and determining the degree of fungi control, i.e. either killing or inhibiting the fungi growth. Treatment with a spray containing 1000 p.p.m. of compound is equivalent to about 2.5 lbs. per acre of active ingredient.

Type of fungi:     Percent control at 1000 p.p.m.

LBT ---------------------------------- 96
    RBD ---------------------------------- 100

LBT=late tomato blight.
RBD=rice blast disease.

EXAMPLE 11

The $C_8$, $C_9$, and $C_{10}$ homologs of 2-nitro-6-oximino cyclohexanone likewise show fungus control activity against a variety of harmful plant fungi. These compounds are of course prepared in the same fashion as their $C_6$ and $C_{12}$ analogs as described in Examples 1–8.

We claim:
1. A fungicidal composition containing as the active ingredient a fungicidally effective amount of a compound of the formula

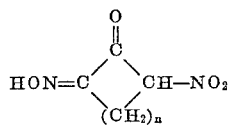

wherein $n$ is 2 to 9 and an inert carrier.
2. The composition of claim 1 wherein said active compound is 2-nitro-6-oximino cyclohexanone.
3. The composition of claim 1 wherein said active compound is 2-nitro-12-oximino cyclododecanone.
4. A method for killing and inhibiting the growth of fungi on vegetation comprising treating said vegetation with an effective amount of a compound of the formula

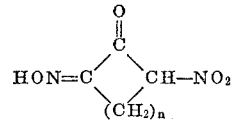

wherein $n$ is 2 to 9.
5. The method of claim 4 wherein said compound is 2-nitro-6-oximino cyclohexanone.
6. The method of claim 4 wherein said compound is applied to said vegetation at a rate ranging from about 0.1 to 10 lbs. of said compound per acre.

References Cited
UNITED STATES PATENTS 3,260,644    7/1966    Schmeling ---------- 424—327

ALBERT T. MEYERS, Primary Examiner
F. E. WADDELL, Assistant Examiner